Dec. 23, 1969   M. KRIEGER   3,484,881
NONWOVEN FABRIC LAMINATE MATERIAL AND METHOD
OF FABRICATING A SHOE THEREFROM
Filed May 31, 1967   2 Sheets-Sheet 1

INVENTOR
MARVIN KRIEGER

BY Herbert M Adrian Jr

ATTORNEY

Dec. 23, 1969 M. KRIEGER 3,484,881
NONWOVEN FABRIC LAMINATE MATERIAL AND METHOD
OF FABRICATING A SHOE THEREFROM
Filed May 31, 1967 2 Sheets-Sheet 2

INVENTOR
MARVIN KRIEGER

BY *Herbert M Adrian Jr*

ATTORNEY

United States Patent Office 3,484,881
Patented Dec. 23, 1969

3,484,881
NONWOVEN FABRIC LAMINATE MATERIAL AND METHOD OF FABRICATING A SHOE THEREFROM
Marvin Krieger, Statesville, N.C., assignor to Fiber Industries, Inc., a corporation of Delaware
Filed May 31, 1967, Ser. No. 642,545
Int. Cl. A43d 95/00; A43b 23/00; D03d 11/00
U.S. Cl. 12—146                                 8 Claims

ABSTRACT OF THE DISCLOSURE

A method of fabricating material particularly suited for shoe uppers comprising a laminate of a nonwoven fibrous substrate and a fabric adhesively bonded to the nonwoven wherein the buckling and wrinkling of the interior surface is eliminated when used as shoe uppers or in the like curved configurations. The improvement is accomplished by pre-embossing the exposed surface of the nonwoven substrate with a plurality of grooves to provide a controlled crease along the inside curvature of the constructed shoe upper.

BACKGROUND

Poromeric and fabric shoe uppers are often constructed of materials having two or more fibrous layers laminated together. Normally one fibrous material serves as the substrate and the other fibrous material is either an exterior fabric or an embedded laminae over which is applied a polymeric surface material of leather-like characteristics. Thus, a material having a leather-like exterior or a fabric exterior can be made as is desired. In most of these applications the fabric is supported by the fibrous substrate which is laminated to the fabric by means of an adhesive. In forming the shoe upper into the desired shape, the laminate material is bent in a concave fashion to conform to the foot shape. Because of the differences in the modulus of elasticities of the fibrous substrate and the fabric material, these concave curvatures result in an interior buckling of the substrate in an aesthetically undesirable and unpredictable manner. In addition such buckling may, in many cases, result in discomfort to the wearer of the shoe.

Because a convenient method of eliminating this buckling was not previously known, the interior of the shoe was commonly lined with a second material to cover the undesirable appearance of the buckling and wrinkling. This, however, does not always satisfy the difficulty because the accompanying discomfort to the wearer normally remains, particularly in the medial and lateral arch quarter of the shoe, while resulting in the additional expense of lining the interior of the shoe.

It is an object of the present invention to provide a material for shoe uppers and the like which eliminates the buckling effect previously encountered in assembling the shoe upper. It is another object of the present invention to provide a method for fabricating shoe uppers wherein the interior lining of the shoe can be eliminated. These and other objects will become apparent to those skilled in the art from the description of the invention which follows.

SUMMARY OF THE INVENTION

In accordance with the invention, a fibrous sheet material is provided comprising a nonwoven substrate layer and a fabric layer laminated to said substrate layer with an adhesive, said nonwoven substrate being embossed on the exposed surface thereof with a plurality of grooves. In addition a method is provided for fabricating shoes from a fibrous sheet material comprised of a nonwoven substrate and a fabric material laminated together with an adhesive, wherein the exposed surface of the nonwoven substrate is embossed with a plurality of grooves, comprising bending said embossed material concavely inwardly with respect to said substrate to form a shoe upper thereby effecting a crease along said groove and attaching said shoe upper to a heel and sole.

The present invention provides a method for not only eliminating the buckling effect previously encountered with fabric laminates in shoe uppers, but also eliminates the requirements for an interior lining as was previously used to cover the buckling defect. The savings in material cost, labor and machinery of the present invention is even further enhanced by the simplicity of the solution to this previously perplexing problem.

Although the invention is particularly applicable to materials composed of a nonwoven substrate, an adhesive and a fabric, the invention is also applicable to a nonwoven substrate to which a polymeric elastomer is bonded. However, the invention will be described more particularly with respect to the most preferred aspect of the invention wherein a fabric material is used in addition to the nonwoven substrate.

The invention will be described more fully by reference to the drawings in which.

Figure 1:
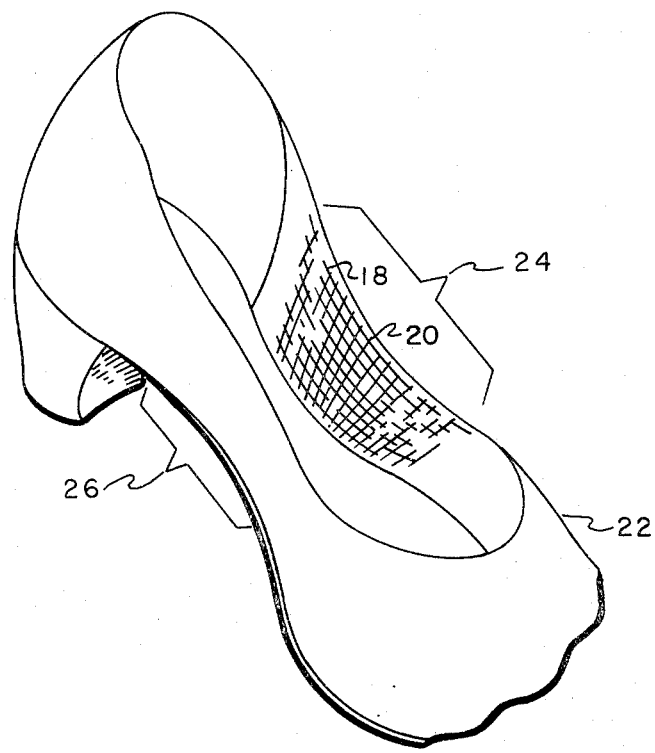
FIG. 1 is a partial perspective view of a shoe made in accordance with the present invention.
Figure 2:
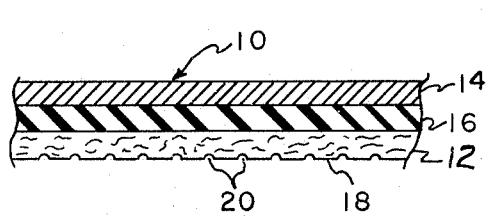
FIGS. 2 and 3 are sectional views of a fibrous laminate material made in the present invention.

Referring now more particularly to FIG. 2, the fibrous material 10 used in the present invention is comprised of a nonwoven substrate 12 bonded to a fabric 14 which may be another nonwoven material or more preferably a woven, knitted or the like fabric structure, together with an adhesive or polymeric elastomer 16 to form a laminate. The exterior surface 18 of the nonwoven substrate 12 is embossed with a plurality of grooves 20 in a spaced relationship to each other. A shoe 22 (FIG. 1) or other item constructed of a fibrous laminate, normally results in a buckling effect on the interior surface of the substrate, particularly in the areas of most pronounced concave curvatures particularly in the medial arch quarter 24 and the lateral arch quarter 26.

Figure 3:
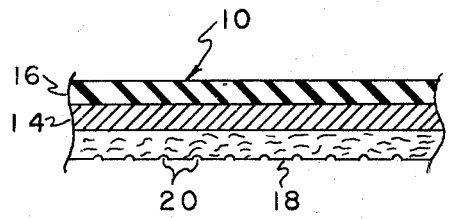
Figure 4:
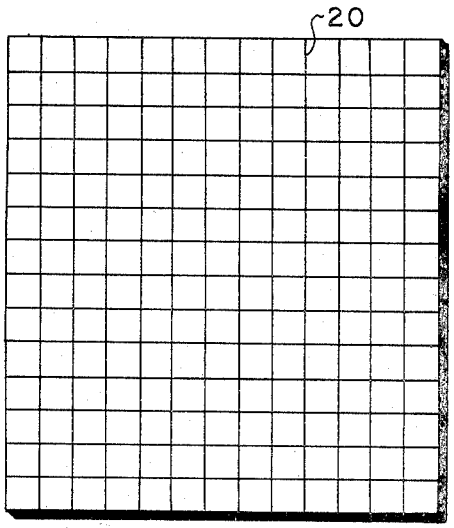
FIGS. 4, 5, 6 and 7 illustrate various embossing patterns useful in the present invention.
Figure 5:
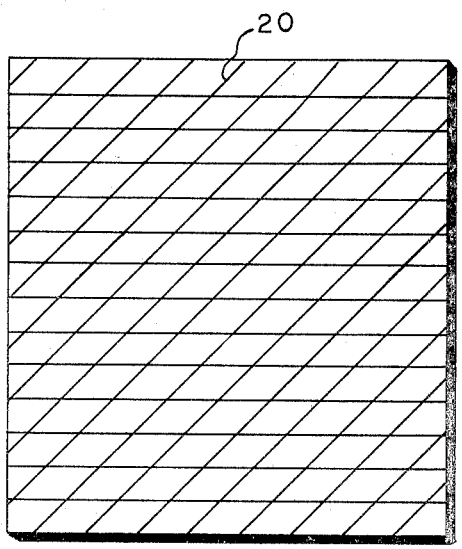
Figure 6:
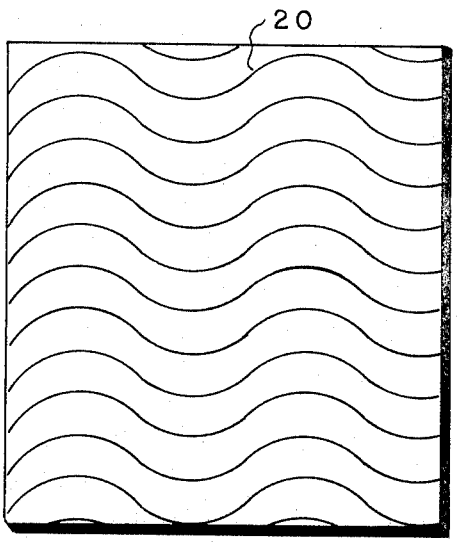
Figure 7:
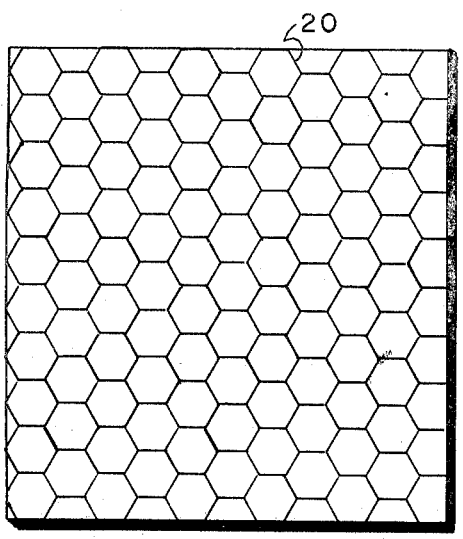

It will be noted that in addition to a fabric exterior shoe as shown in FIG. 2, the present invention is also applicable to a poromeric type structure as in FIG. 3 wherein fabric 14 is an embedded reinforcement with the elastomer coating 16 making up the exterior shoe surface. In this instance some additional bonding means (not shown) may be needed to hold fabric 14 to substrate 12. Alternatively, an elastomer which will penetrate fabric 14 to substrate 12 can be used to secure the desired bonding.

The depth of the grooves can vary widely depending at least partially on the thickness of the substrate, the adhesive layer and the fabric layer, the differences in the modulus of elasticity of the fabric material and the nonwoven substrate, the distance between grooves and the like. Normally, a groove depth of about 5 to 70 percent or more of the nonwoven substrate thickness is satisfactory. More particularly, the depth is in the range of about 1 mil to about 15 mils, again depending on the thickness of the nonwoven substrate and other factors enumerated above. The distance between parallel grooves can also vary widely again being related to the factors considered in determining the groove depth. Normally, however, the distance between parallel grooves is about 0.001 to about 0.4 inch or more and more preferably about 0.01 to about 0.3 inch, the smaller distances being most preferred. Preferably, no point on the surface of the nonwoven is more than about 0.3 inch from a groove and more preferably not more than about 0.2 inch from a groove.

The particular groove pattern can also vary widely. The choice is often weighted heavily toward a particularly desirable aesthetic effect. Thus, numerous patterns can be used, particularly grids, parallel curves, intersecting curves and the like are used with correspondingly good results. However, for functionally good results, an ordinary grid type pattern has been found to be very effective.

The embossing of the substrate can be effected either prior to or after the lamination of the fabric onto the nonwoven substrate. However, it is often convenient to emboss the substrate prior to lamination by any of various means such as pressure calendering of the bonded or nonbonded substrate.

The nonwoven substrate is of a fibrous composition selected to provide certain desirable properties such as water vapor permeability, particularly when the end use is for footwear, hatbands, clothing or other close bodily contact items. To provide a substrate which will aid in enhancing water permeability, it is often desirable to combine hydrophollic and hydrophobic fibers in various proportions in forming the nonwoven substrate. Thus, the fibrous materials can be cotton, flax, jute, silk, wool, asbestos, rayon, acetate, polyester, polyamide, polyethylene, polypropylene, polyurethane, polyvinyls, acrylics and the like fibers and mixtures thereof as well as cellulose based fibers.

The nonwoven substrate usually includes, and is partially held together by, a bonding agent which is normally a resinous material such as nonfibrous polyesters, polyurethanes, ureaformaldehyde resins, latexes, butyl rubbers and the like natural and synthetic polymeric materials.

The most preferred nonwoven compositions are blends of synthetic fibers such as a blend of polyester staple and polypropylene staple needled to a high density such as that obtained in needling the batting with about 1000 to 5000 punches per square inch. In addition, combinations of continuous filaments and staple can be used as the substrate material wherein the materials are needled together or laminated together.

The nonwoven substrate is preferably of a thickness of about 0.005 to about 0.3 inch and more preferably of a thickness of about 0.02 to about 0.1 inch. The tensile strength is about 5 to 1000 pounds per square inch or more, and more preferably about 900 to 1600 pounds per square inch. The nonwoven is often preferably sueded on the nonembossed side to increase the adhesion of the adhesive thereto.

The fabric used for the exterior surface in fabric finished products, or as an interior support for poromeric materials, can be a woven, nonwoven, knit or the like material of any weave or design. Fibers of the same type described for the nonwoven are used. The particular weave or texture of the fabric is chosen in accordance with the particular style and aesthetic effect desired in the end product.

The denier of the structural fiber component of both the nonwoven substrate and the fabric can be varied widely. It can be as great as about 30 denier per filament or more, but normally fibers of about 0.5 to about 10 denier per filament and more preferably 1 to 5 denier per filament are preferred because they are easier to handle and give the product greater pliability and toughness.

The nonwoven substrate is laminated to the fabric material by means of an adhesive which can be applied either as a continuous film or as a spot welding type adhesive. The particular method used is often dependent on the aesthetic qualities desired in the end product. Thus, with an exterior fabric finish, a quilting effect can be achieved by applying the adhesive in a grid like pattern and subsequently laminating the materials together with the adhesive in the grid like pattern. When the adhesive is applied as a continuous film, as is often desired, the end use of the product determines the particular technique utilized. For instance, when the fabric is used for footwear, water vapor permeability is desirable. Therefore, the adhesive is preferably one which will permit water permeability. Thus, a continuous film application is of a porous type film-forming polymer.

For poromerics, the adhesive may be applied separately between the substrate and the fabric with the elastomer applied over the fabric or the elastomer can serve as the binder by applying it over the fabric and inducing penetration thereof through the fabric to the substrate.

Numerous adhesives are known and utilized to effect the lamination. Such adhesives are preferably of the flexible type known as elastomers and are normally of the same type used in poromeric materials. These adhesives have resiliency and flexibility of a rubber-like nature. Particularly desirable adhesives are polyurethanes, polyesters, polyethers, polyvinyls such as polyvinyl chloride, polyvinylidene chloride, polyvinyl chloride-vinyl acetate copolymers, vinyl chloride-vinylidene chloride copolymers and mixtures of the same and the like compositions. Other suitable polymers include various copolymers of vinyl chloride or other vinyl halides with monomers such as vinyl acetate, vinylidene chloride, dimethyl maleate and vinyl acetals such as vinyl butyral chloride. Such polymers and elastomers may or may not contain plasticisers as may be desirable but the particular polymer used is chosen to yield the most desirable flexibility and adhesion. While any of these various elastomeric materials as well as any other adhesive can be used, particularly desirable effects can be obtained using foamed elastomeric materials such as foamed polyurethanes particularly when the fabric is used as the interior finish. These materials readily provide the desired vapor permeability as well as the adhesive characteristics while accomplishing particularly desirable aesthetic qualities. Thus, the term adhesive is used herein in its broad sense to include poromeric finishes of flexible polymeric materials of the elastomeric type.

The thickness of the adhesive can vary widely from a thickness of merely an adhesive quantity such as about 0.001 inch to a thickness of about 0.4 inch such as that generally utilized with a foamed polyurethane material. More preferably, the thickness use is of about 0.005 to 0.1 inch. The particular thickness utilized is determined with particular emphasis on the aesthetic characteristics desired. The adhesive is normally preferably applied in an adhesive amount sufficient to permanently bond the nonwoven substrate to the exterior fabric.

While there have been described various embodiments of the present invention, it is to be understood that specific embodiments of the invention presented herein are not to be construed as limiting the invention. It is intended to cover the invention broadly being limited only by the appended claims.

What is claimed is:

1. A fibrous sheet material comprising a nonwoven substrate layer and a fabric layer laminated to said substrate layer with an adhesive, said adhesive comprising a foamed elastomeric material, said nonwoven substrate being embossed on the exposed surface thereof with a plurality of grooves, wherein one exposed surface is the embossed nonwoven substrate and the other exposed surface is the elastomeric material, said fabric being embedded therebetween.

2. The fibrous sheet material of claim 1 wherein the grooves are intersecting grooves.

3. The fibrous sheet material of claim 1 wherein the grooves are parallel and in a spaced relationship to each other.

4. The fibrous sheet material of claim 1 wherein the grooves are of a depth of about 5 to 70 percent of the nonwoven substrate.

5. The fibrous sheet material of claim 1 wherein the grooves are of a distance of about 0.001 to about 0.4 inch apart.

6. The fibrous sheet material of claim 1 wherein no point on the surface thereof is more than about 0.3 inch from a line of embossing.

7. A method of fabricating a shoe from a fibrous sheet material comprising a nonwoven substrate and a fabric material laminated together with an adhesive wherein the exposed surface of the nonwoven substrate is embossed with a plurality of grooves comprising bending said embossed material concavely inwardly with respect to said substrate to form a shoe upper thereby effecting a crease along said groove and attaching said shoe upper to a heel and sole.

8. The method of claim 7 wherein the grooves are in a grid configuration.

References Cited

UNITED STATES PATENTS

| | | | |
|---|---|---|---|
| 1,201,927 | 10/1916 | Blum | 12—142 |
| 2,792,320 | 5/1957 | Bower | 161—89 |
| 3,063,074 | 11/1962 | Scholl | 12—142 |
| 3,173,826 | 5/1965 | Campbell et al. | 161—161 |
| 2,205,577 | 6/1940 | Roberts | 36—45 |
| 2,622,052 | 12/1952 | Chandler | 36—45 |
| 3,089,164 | 5/1963 | Meserve | 12—40 |
| 3,130,505 | 4/1964 | Markevitch | 36—45 |
| 3,370,363 | 2/1968 | Kaplan | 36—9 |

PATRICK D. LAWSON, Primary Examiner

U.S. Cl. X.R.

36—45; 161—89